United States Patent
Seo et al.

(10) Patent No.: US 9,965,605 B2
(45) Date of Patent: May 8, 2018

(54) APPARATUS AND METHOD FOR AUTOMATIC UNLOCKING OF PORTABLE TERMINAL

(71) Applicant: Samsung Electronics Co., Ltd, Gyeonggi-do (KR)

(72) Inventors: Jin-Won Seo, Daegu (KR); Ju-Ho Hyun, Gyeonggi-do (KR); Sung-Wook Hyun, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 144 days.

(21) Appl. No.: 13/651,268

(22) Filed: Oct. 12, 2012

(65) Prior Publication Data

US 2013/0097693 A1    Apr. 18, 2013

(30) Foreign Application Priority Data

Oct. 14, 2011    (KR) ........................ 10-2011-0105236

(51) Int. Cl.
| | | |
|---|---|---|
| G06F 12/00 | (2006.01) | |
| G11C 7/00 | (2006.01) | |
| G06F 21/31 | (2013.01) | |
| G06F 21/33 | (2013.01) | |

(52) U.S. Cl.
CPC ............ *G06F 21/316* (2013.01); *G06F 21/33* (2013.01); *G06F 2221/2111* (2013.01)

(58) Field of Classification Search
USPC .................................................... 726/16–20
See application file for complete search history.

(56) References Cited

U.S. PATENT DOCUMENTS

| | | | |
|---|---|---|---|
| 7,702,314 B2 | 4/2010 | Kang | |
| 2004/0046638 A1* | 3/2004 | Kawasaki | H04W 12/12 340/5.61 |
| 2005/0221798 A1* | 10/2005 | Sengupta et al. | 455/411 |
| 2007/0228160 A1 | 10/2007 | Takayanagi | |
| 2008/0039212 A1* | 2/2008 | Ahlgren et al. | 463/46 |
| 2009/0316960 A1 | 12/2009 | Wang | |
| 2010/0048167 A1 | 2/2010 | Chow et al. | |
| 2011/0312345 A1* | 12/2011 | Nam | H04W 64/00 455/456.2 |
| 2013/0019292 A1* | 1/2013 | Varshavsky | H04L 9/3231 726/7 |
| 2013/0031619 A1* | 1/2013 | Waltermann | G06F 21/305 726/8 |

FOREIGN PATENT DOCUMENTS

| | | | | |
|---|---|---|---|---|
| HU | WO 2009112929 A2 * | 9/2009 | ............ | H04L 45/00 |
| KR | 10-2004-0039786 | 5/2004 | | |
| KR | 10-2006-0057085 | 5/2006 | | |
| WO | WO 2009112929 A2 * | 9/2009 | | |

OTHER PUBLICATIONS

Korean Notice of Preliminary Rejection for Korean Application No. 10-2011-0105236, dated Jul. 13, 2017. (13 pages).

* cited by examiner

*Primary Examiner* — Evans Desrosiers (57) ABSTRACT

A method automatically unlocks a portable terminal. The method includes collecting specific information by the portable terminal at a current location, and if the specific information satisfies a pre-set condition, automatically unlocking the terminal.

14 Claims, 6 Drawing Sheets

APPARATUS AND METHOD FOR AUTOMATIC UNLOCKING OF PORTABLE TERMINAL

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Oct. 14, 2011 and assigned Serial No. 10-2011-0105236, the entire disclosure of which is hereby incorporated by reference.

TECHNICAL FIELD OF THE INVENTION

The present disclosure relates to an apparatus and method for automatic unlocking of a portable terminal.

BACKGROUND OF THE INVENTION

A portable terminal can store important data such as a large volume of address book, business data, and a personal banking certificate. Therefore, a user sets a pattern or password on the portable terminal for a security reason. When the user sets a difficult pattern or password to enforce security, it is inconvenient for the user to use the portable terminal even though security is enforced. On the contrary, when the user sets an easy pattern or password, it is convenient for the user to use the portable terminal, but there is a problem in that security of the portable terminal is weak.

In addition, the user feels inconvenience since the user has to unlock the portable terminal whenever using the portable terminal. Therefore, there is an urgent need to propose a method in which a portable terminal can be used directly without having to perform a certain procedure in a specific region or situation where the user does not have to unlock the portable terminal.

SUMMARY OF THE INVENTION

To address the above-discussed deficiencies of the prior art, it is a primary object to provide at least the advantages described below. Accordingly, an aspect of the present disclosure is to provide an apparatus and method for automatic unlocking of a portable terminal when the portable terminal which collects location information is located in a pre-set specific region.

Another aspect of the present disclosure is to provide an apparatus and method for automatic unlocking of a portable terminal when the portable terminal which collects information from a neighboring device satisfies a pre-set specific condition.

Another aspect of the present disclosure is to provide an apparatus and method for automatic unlocking of a portable terminal to improve user convenience and security in such a manner that the portable terminal is automatically unlocked only in a pre-set specific condition.

In accordance with an aspect of the present disclosure, a method of automatic unlocking of a portable terminal is provided. The method comprises collecting specific information by the portable terminal at a current location, and if the specific information satisfies a pre-set condition, automatically unlocking the terminal.

In accordance with an aspect of the present disclosure, a method for automatic unlocking of a portable terminal is provided. The method comprises setting a specific condition between a device and a neighboring portable terminal, and if the terminal is located in a pre-set range, transmitting device information to the terminal.

In accordance with an aspect of the present disclosure, an apparatus for automatic unlocking of a portable terminal is provided. The apparatus comprises an information collector for collecting specific information at a current location, and a controller for automatically unlocking the terminal if the specific information satisfies a pre-set condition.

In accordance with an aspect of the present disclosure, an apparatus for automatic unlocking of a portable terminal is provided. The apparatus comprises a controller for setting a specific condition between a device and a neighboring portable terminal, and a communication module for transmitting device information to the terminal if the terminal is located in a pre-set range.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on user's or operator's intension and usage. That is, the terms used herein must be understood based on the descriptions made herein. Further, like reference numerals denote parts performing similar functions and actions through the drawings.

Figure 1:
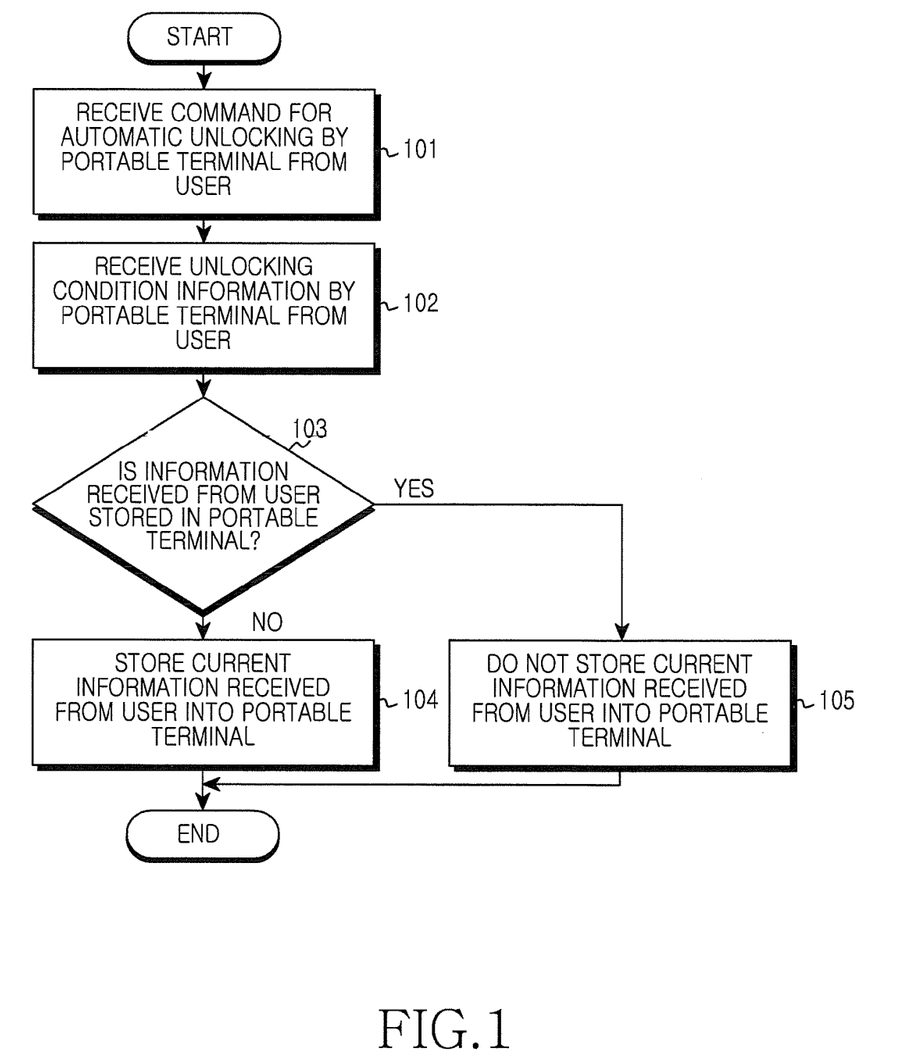
FIG. 1 illustrates a method of configuring automatic unlocking of a portable terminal according to an exemplary embodiment of the present disclosure.

FIG. 1 illustrates a method of configuring automatic unlocking of a portable terminal according to an exemplary embodiment of the present disclosure. Referring to FIG. 1, the portable terminal receives a command for automatic unlocking from a user (step 101). More specifically, the command may be a command for executing an automatic unlocking application, or may be a command for executing an automatic unlocking function included in the portable terminal.

Upon receiving the command for automatic unlocking from the user, the portable terminal receives location information or neighboring device information from the user (step 102). First, in a process of receiving the location information by the portable terminal from the user, when the portable terminal receives a command for configuring automatic unlocking from the user and a command for indicating that the portable terminal uses location information of a specific region, the portable terminal displays a specific region location in a display unit. Thereafter, the portable terminal receives at least one region selected by the user from specific region locations displayed in the display unit. For example, the user can select an office or home which does not require locking of the portable terminal as the specific region. This is because the office or home of the user does not have a security problem even if the portable terminal is not locked by using a pattern or a password. As described above, when the portable terminal receives a specific region selected by the user, the portable terminal displays a message for determining a radius of the specific region. Thereafter, if the radius of the specific region is input from the user, a region in which the portable terminal is automatically unlocked is determined by using location information of the specific region. That is, after receiving the specific region selected by the user and the radius having a specific distance from the specific region, if the portable terminal is located within the input radius, the portable terminal is automatically unlocked.

Second, a process of receiving the neighboring device information by the portable terminal from the user will be described. As an example in which the portable terminal receives device information from a neighboring device, the portable terminal and a home appliance used in a user's home are pre-set to perform near field communication. More specifically, near field communication such as Bluetooth or ZigBee has a communication range allowing mutual communication. That is, if the portable terminal is located in a near field communication range of the home appliance, the portable terminal can receive information indicating that the portable terminal is located in the near field communication range from the home appliance. Alternatively, a sensor can be attached to the home appliance so that, if the portable terminal is located within a pre-set distance from the home appliance, the portable terminal can receive distance information indicating that the portable terminal is located within the pre-set distance from the home appliance. Alternatively, if the portable terminal and the home appliance are located in the same base station, the location information may be transmitted from the base station to the portable terminal. Therefore, since the user receives device information from the home appliance of the home or office, the user can use the portable terminal without having to draw a pattern displayed on an idle screen of the portable terminal or having to input a password, thereby improving user convenience.

For another example of receiving the device information by the portable terminal of the user from the neighboring device, the portable terminal can be pre-set to perform near field communication with an automobile of the user. More specifically, near field communication such as Bluetooth or ZigBee has a communication range allowing mutual communication. That is, if the portable terminal is located in a near field communication range of the automobile of the user, the portable terminal can receive information indicating that the portable terminal is located in the near field communication range from the automobile of the user. Alternatively, a sensor can be attached to the automobile so that, if the portable terminal is located within a pre-set distance from the automobile of the user, the portable terminal can receive distance information indicating that the portable terminal is located within the pre-set distance from the automobile. Alternatively, if the portable terminal and the automobile of the user are located in the same base station, the location information may be transmitted from the base station to the portable terminal. Therefore, since the user receives device information from the automobile of the user, the user can use the portable terminal without having to draw a pattern displayed on an idle screen of the portable terminal or having to input a password, thereby improving user convenience.

For another example of receiving the device information by the portable terminal of the user from the neighboring device, the portable terminal of the user can be pre-set to perform near field communication with another portable terminal used by a friend, family member, and co-worker of the user. More specifically, near field communication such as Bluetooth or ZigBee has a communication range allowing mutual communication. That is, if the portable terminal is located in a near field communication range of a different portable terminal, the portable terminal can receive information indicating that the portable terminal is located in the near field communication range from the different portable terminal. Alternatively, a sensor included in the different portable terminal can be used so that, if the portable terminal is located within a pre-set distance from the different portable terminal, the portable terminal can receive distance information indicating that the portable terminal is located within the pre-set distance from the different portable terminal. Alternatively, if the portable terminal and the different portable terminal are located in the same base station, the location information may be transmitted from the base station to the portable terminal of the user. Therefore, since the user receives device information from the different portable terminal, the user can use the portable terminal without having to draw a pattern displayed on an idle screen of the portable terminal or having to input a password, thereby improving user convenience.

If the portable terminal receives the location information or the neighboring device information from the user, the portable terminal determines whether the input information is similar or identical to information currently stored in the portable terminal (step 103). That is, the portable terminal determines whether the identical location information or neighboring device information is stored in the portable terminal. This is because it is unnecessary to store the identical information repetitively.

If the portable terminal determines that the user input information is different from the information stored in the portable terminal, information currently input by the user is stored (step 104). If the portable terminal determines that the user input information is similar or identical to the information pre-stored in the portable terminal, the information currently input by the user is not stored (step 105), and the procedure of FIG. 1 ends.

Figure 2:
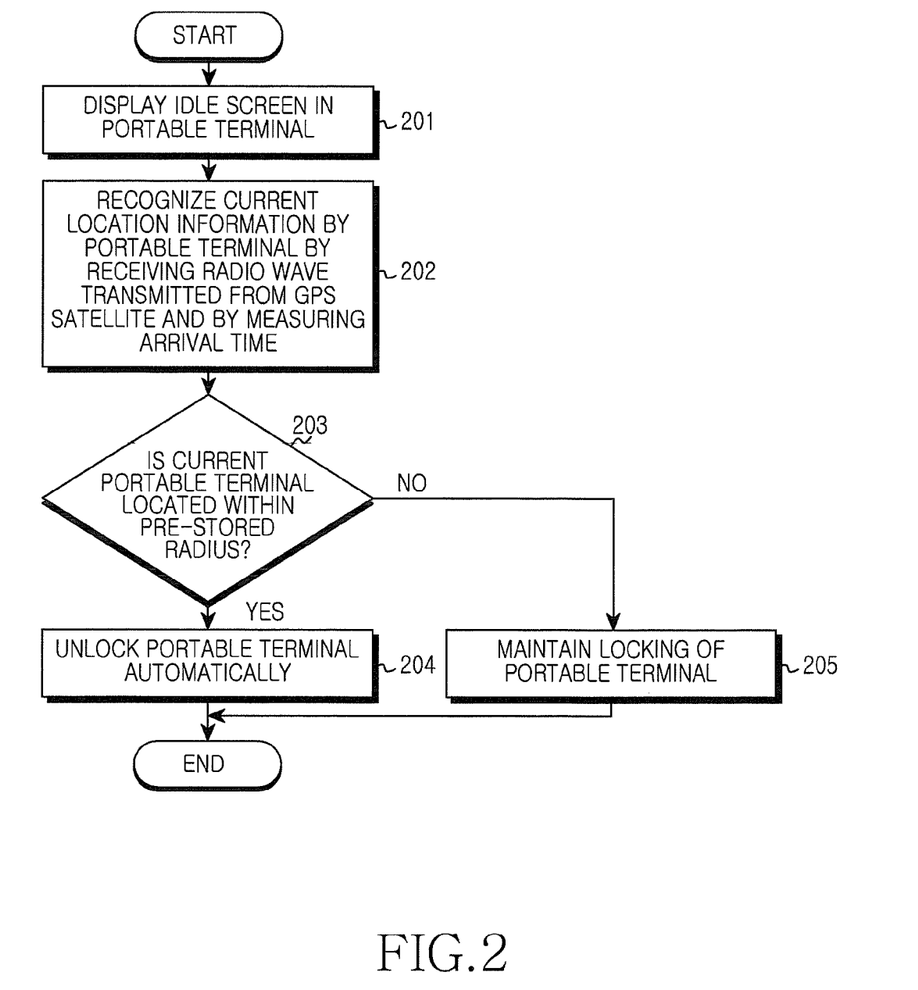
FIG. 2 illustrates an automatic unlocking method using location information of a portable terminal according to an exemplary embodiment of the present disclosure.

FIG. 2 illustrates an automatic unlocking method using location information of a portable terminal according to an exemplary embodiment of the present disclosure. Referring to FIG. 2, when a user who intends to use the portable terminal presses a start button of the portable terminal, an idle screen is displayed in the portable terminal (step 201). Thereafter, the portable terminal receives a radio wave transmitted from at least one Global Positioning System (GPS) satellite to measure an arrival time from the GPS satellite to the portable terminal, and recognizes current location information of the portable terminal (step 202).

As described in detail with reference to FIG. 1, the user selects and designates a specific region. The user can determine and store any radius in the selected specific region. If the portable terminal of the user is located within any radius stored by the user, the portable terminal is automatically unlocked. Therefore, if the user sets and stores any radius, the portable terminal determines whether the portable terminal is located within the pre-stored radius (step 203).

If the portable terminal is currently located within the radius pre-set by the user, the portable terminal locked by using a pattern or a password is automatically unlocked (step 204). It is inconvenient if the user has to unlock the portable terminal whenever the user uses the portable terminal locked by using the pattern or the password. However, since a place such as a user's home or office is a place in which security can be maintained, the aforementioned location information can be pre-stored in the portable terminal so that the user can conveniently use the portable terminal without having to unlock the portable terminal when using the portable terminal.

If the portable terminal is currently not located within the radius pre-set by the user, or if the user does not pre-store the specific region by determining the specific region, the portable terminal remains in a locked state (step 205).

Figure 3:
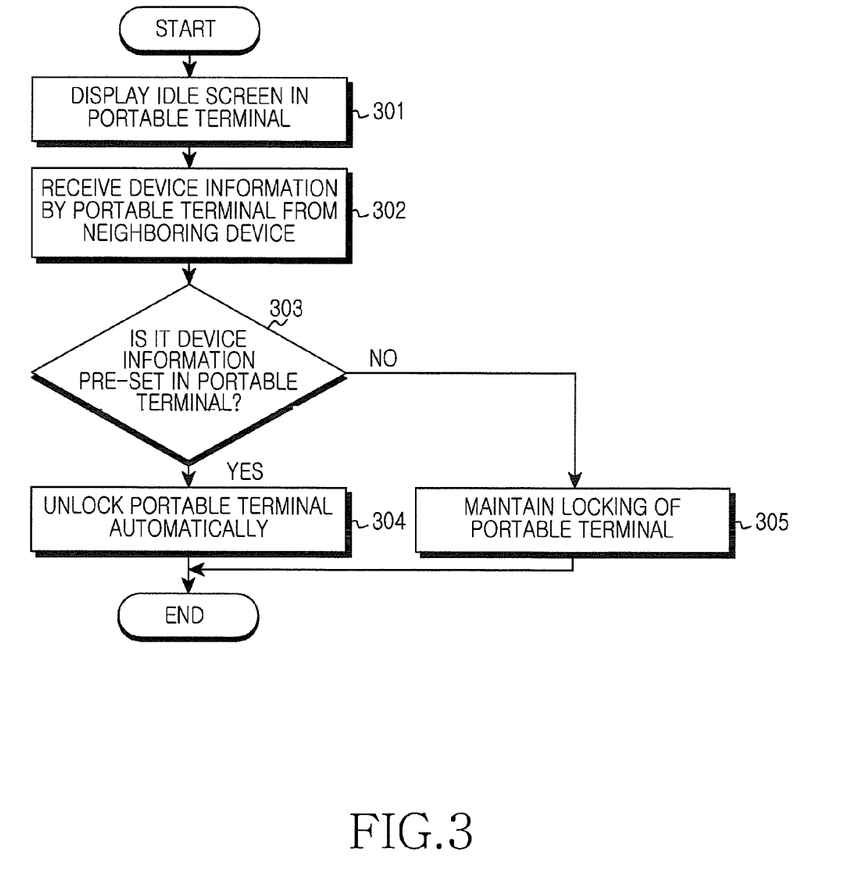
FIG. 3 illustrates an automatic unlocking method using neighboring device information of a portable terminal according to an exemplary embodiment of the present disclosure.

FIG. 3 illustrates an automatic unlocking method using neighboring device information of a portable terminal according to an exemplary embodiment of the present disclosure. Referring to FIG. 3, when a user who intends to use the portable terminal presses a start button of the portable terminal, an idle screen is displayed in the portable terminal (step 301). Thereafter, the portable terminal receives device information from a neighboring device (step 302). First, the neighboring device denotes a home appliance (e.g., a Television (TV), a Personal Computer (PC), a refrigerator, a washing machine, etc.), an automobile of the user, and another portable terminal used by a friend, family member, and co-worker of the user. Further, the neighboring device information denotes information transmitted from the aforementioned neighboring device to the portable terminal. More specifically, if it is pre-set such that the portable terminal of the user performs near field communication with the device, the information may indicate that near field communication is pre-set between the portable terminal and the pre-set device. Alternatively, when a sensor is attached to the pre-set device, the information may be distance information transmitted from the device to the portable terminal, and if the portable terminal and the device are located in the same base station, the information may be location information transmitted from the base station to the portable terminal.

As an example in which the portable terminal of the user receives device information from the neighboring device, a home appliance used in a user's home and the portable terminal are pre-set to perform near field communication. More specifically, near field communication such as Bluetooth or ZigBee has a communication range allowing mutual communication. That is, if the portable terminal is located in a near field communication range of the home appliance, the portable terminal can receive information indicating that the portable terminal is located in the near field communication range from the home appliance. Alternatively, a sensor can be attached to the home appliance so that, if the portable terminal is located within a pre-set distance from the home appliance, the portable terminal can receive distance information indicating that the portable terminal is located within the pre-set distance from the home appliance. Alternatively, if the portable terminal and the home appliance are located in the same base station, the location information may be transmitted from the base station to the portable terminal. Therefore, since the user receives device information from the home appliance of the home or office, the user can use the portable terminal without having to draw a pattern displayed on an idle screen of the portable terminal or having to input a password, thereby improving user convenience.

For another example of receiving the device information by the portable terminal of the user from the neighboring device, the portable terminal can be pre-set to perform near field communication with an automobile of the user. More specifically, near field communication such as Bluetooth or ZigBee has a communication range allowing mutual communication. That is, if the portable terminal is located in a near field communication range of the automobile of the user, the portable terminal can receive information indicating that the portable terminal is located in the near field communication range from the automobile of the user. Alternatively, a sensor can be attached to the automobile so that, if the portable terminal is located within a pre-set distance from the automobile of the user, the portable terminal can receive distance information indicating that the portable terminal is located within the pre-set distance from the automobile. Alternatively, if the portable terminal and the automobile of the user are located in the same base station, the location information may be transmitted from the base station to the portable terminal. Therefore, since the user receives device information from the automobile of the user, the user can use the portable terminal without having to draw a pattern displayed on an idle screen of the portable terminal or having to input a password, thereby improving user convenience.

For another example of receiving the device information by the portable terminal of the user from the neighboring device, the portable terminal of the user can be pre-set to perform near field communication with another portable terminal used by a friend, family member, and co-worker of the user. More specifically, near field communication such as Bluetooth or ZigBee has a communication range allowing mutual communication. That is, if the portable terminal is located in a near field communication range of a different portable terminal, the portable terminal can receive information indicating that the portable terminal is located in the near field communication range from the different portable terminal. Alternatively, a sensor included in the different portable terminal can be used so that, if the portable terminal is located within a pre-set distance from the different portable terminal, the portable terminal can receive distance information indicating that the portable terminal is located within the pre-set distance from the different portable terminal. Alternatively, if the portable terminal and the different portable terminal are located in the same base station, the location information may be transmitted from the base station to the portable terminal of the user. Therefore, since the user receives device information from the different portable terminal, the user can use the portable terminal without having to draw a pattern displayed on an idle screen of the portable terminal or having to input a password, thereby improving user convenience.

After the portable terminal receives the device information from the neighboring device, the portable terminal determines whether the device information is pre-set in the portable terminal (step 303). If the portable terminal determines that the device information is pre-set in the portable terminal, the portable terminal locked by using a pattern or a password is automatically unlocked (step 304). It is inconvenient if the user has to unlock the portable terminal whenever the user uses the portable terminal locked by using the pattern or the password. However, since a place such as a user's home or office in which a specific device is located is a place in which security can be maintained, if the portable terminal determines that the device information is pre-set by receiving the device information from the portable terminal, the portable terminal is automatically unlocked so that the user can conveniently use the portable terminal. Otherwise, if the portable terminal does not determine that the device information is pre-set in the portable terminal, the portable terminal remains in a locked state (step 305).

Figure 4:
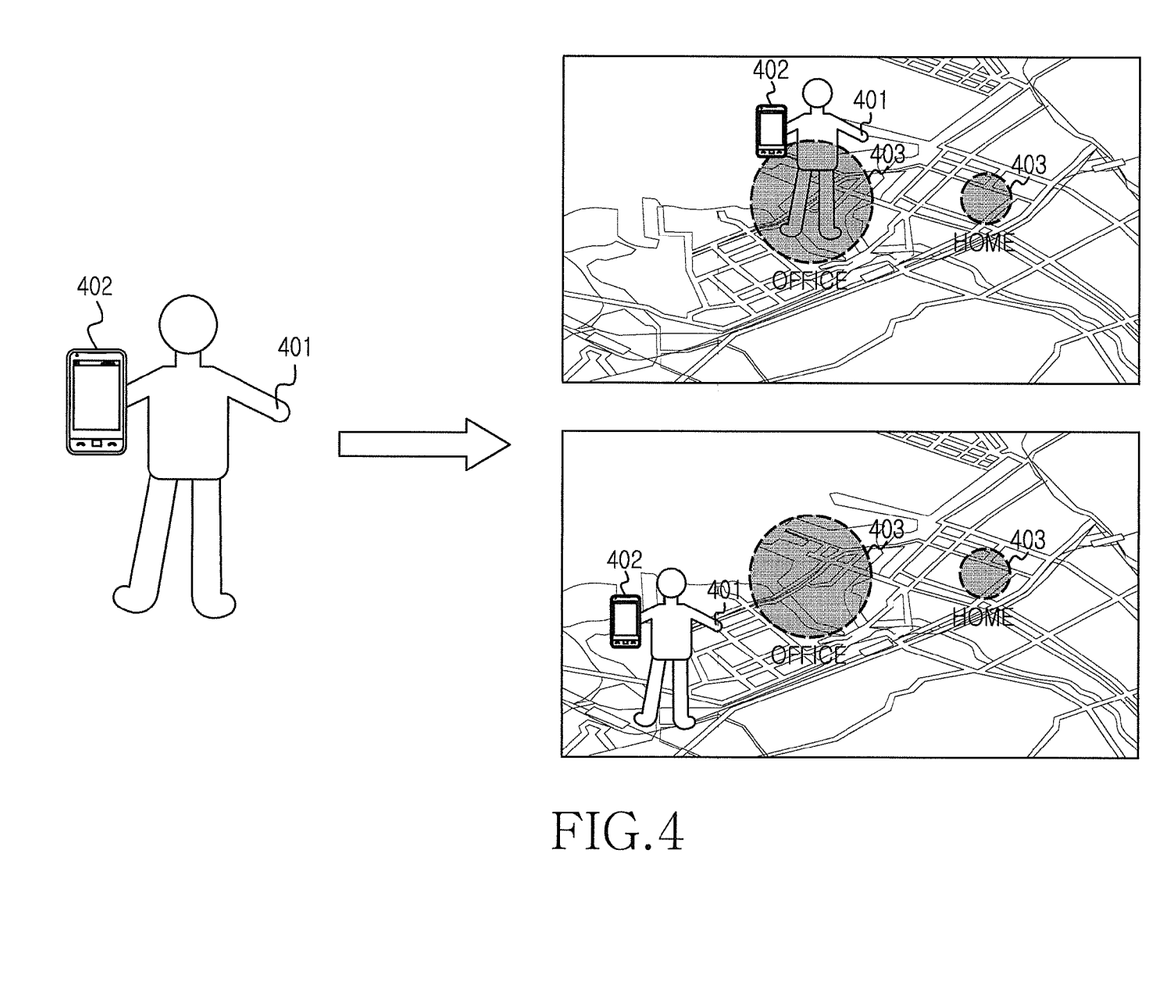
FIG. 4 illustrates an automatic unlocking method of a portable terminal of which location information is pre-set according to an exemplary embodiment of the present disclosure.

FIG. 4 illustrates an automatic unlocking method of a portable terminal of which location information is pre-set according to an exemplary embodiment of the present disclosure. Referring to FIG. 4, it is assumed that a user 401 first sets any radius 403 of a home and an office, and the user 401 has a portable terminal 402. If the user 401 having the portable terminal 402 is located within the radius 403 from the office and intends to use the portable terminal 402, when the user 401 presses a start button of the portable terminal 402, an idle screen is displayed in the portable terminal. Thereafter, the portable terminal receives current location information of the portable terminal from a GPS satellite. Upon receiving the location information from the GPS satellite, the portable terminal 402 determines that the portable terminal 402 is located within the pre-set radius 403, and thus the portable terminal 402 is automatically unlocked.

If the user 401 having the portable terminal 402 is out of the pre-set radius 403 in the office, the portable terminal 402 is not automatically unlocked. That is, if the portable terminal is out of the radius 403 pre-set by the user 401, the portable terminal 402 determines that the portable terminal 402 is not located within the radius 403 pre-set by the user 401, and thus the portable terminal is not automatically unlocked. Therefore, even if the user 401 loses the portable terminal 402 and a third person acquires the portable terminal 402, important data stored in the portable terminal 402 cannot be read, and thus personal information of the user 401 is not revealed.

Figure 5:
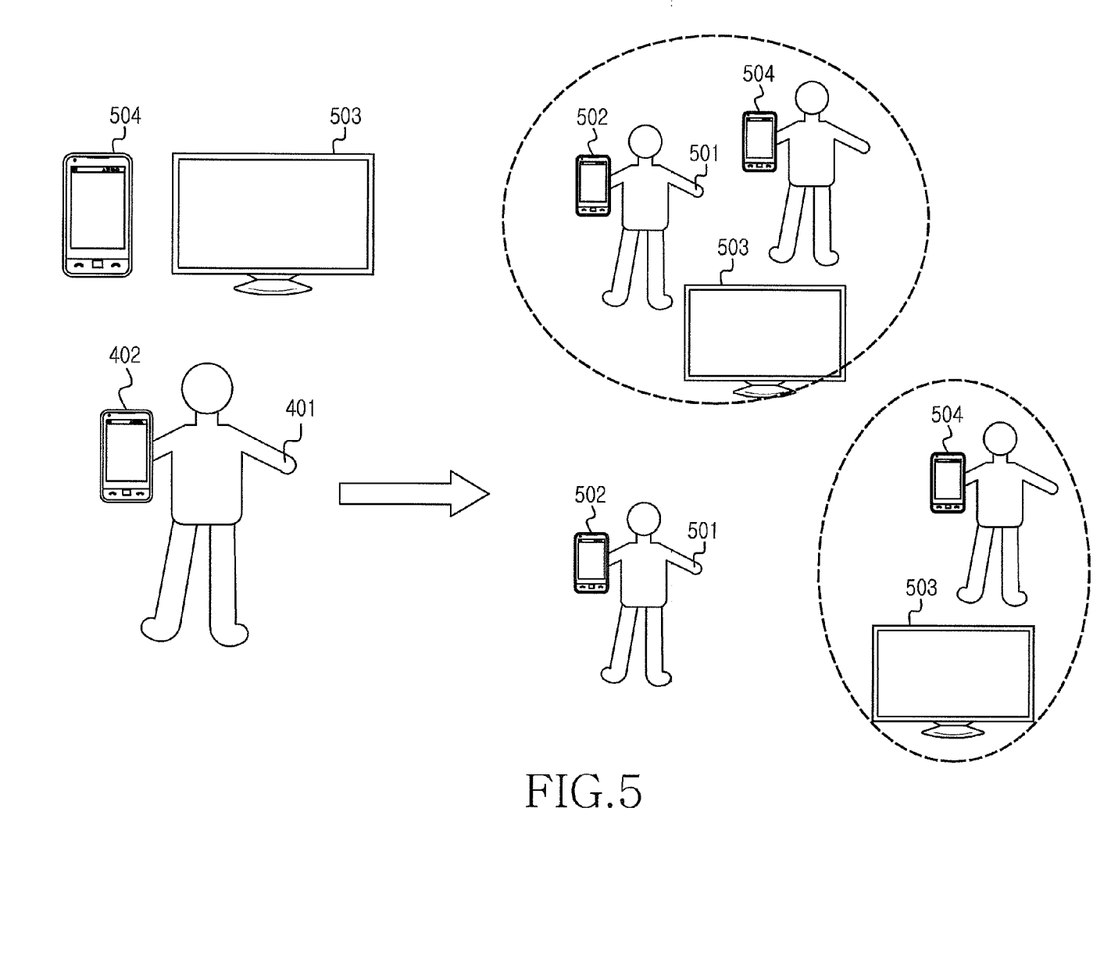
FIG. 5 illustrates a process of automatically unlocking a portable terminal by using neighboring device information according to an exemplary embodiment of the present disclosure.

FIG. 5 illustrates a process of automatically unlocking a portable terminal by using neighboring device information according to an exemplary embodiment of the present disclosure. Referring to FIG. 5, it is first assumed that a PC 503 located in a home or office of a user 501 and a portable terminal 504 of a friend are pre-set as a neighboring device. A portable terminal 502 is automatically unlocked when the PC 503 located in the home or office of the user 501, the portable terminal 504 of the friend, and the portable terminal 502 of the user 501 are located in a communication range allowing near field communication, within a distance that can be recognized by a sensor, and in the same base station. This is because, in such a place as the home or office in which the PC 503 is located, personal information of the user 501 is not revealed to a third person even if the portable terminal 502 is not locked. In addition, when the user 501 is located within a near distance from a close field, a family member, and a co-worker, security may no longer be an issue. Therefore, the portable terminal 502 can be automatically unlocked when the portable terminal 502 receives device information from a neighboring device pre-set by the user 501.

The portable terminal 502 is not automatically unlocked when the PC 503 located in the home or office of the user 501, the portable terminal 504 of the friend, and the portable terminal 502 of the user 501 are not located in a communication range allowing near field communication, within a distance that can be recognized by a sensor, and in the same base station. That is, when the portable terminal 502 fails to receive the device information from the neighboring device, the portable terminal 502 is not automatically unlocked. Therefore, even if the user 501 loses the portable terminal 502 and a third person acquires the portable terminal 502, important data stored in the portable terminal 502 cannot be read, and thus personal information of the user 501 is not revealed.

Although the PC located in the home or office of the user and the portable terminal of the friend are used as the neighboring device for example in FIG. 5, as described in detail with reference to FIG. 3, the present disclosure also applies to a home appliance (e.g., a TV, a refrigerator, a washing machine, etc.) and an automobile of the user.

Figure 6:
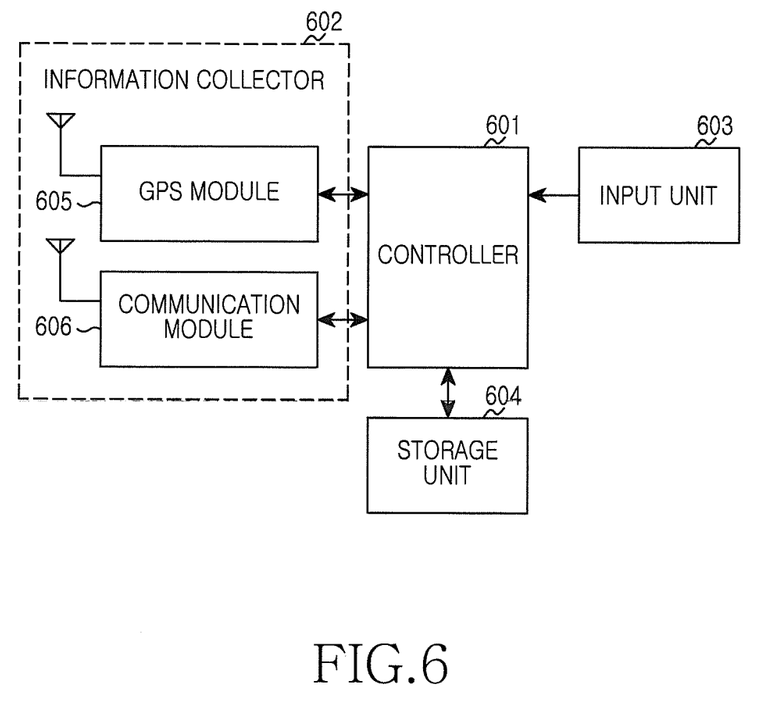
FIG. 6 illustrates a block diagram of an automatic unlocking apparatus of a portable terminal according to an exemplary embodiment of the present disclosure.

FIG. 6 is a block diagram illustrating a structure of an automatic unlocking apparatus of a portable terminal according to an exemplary embodiment of the present disclosure. Referring to FIG. 6, the automatic locking apparatus of the portable terminal may include a controller 601, an information collector 602, an input unit 603, and a storage unit 604. The information collector 602 may include a GPS module 605 and a communication module 606.

The controller 601 provides overall control to the portable terminal. For example, the controller 601 collects location information and neighboring device information, and if the collected information satisfies a pre-set condition, automatically unlocks the portable terminal, and determines whether the input information is pre-stored information, and if the input information is pre-stored, does not store the input information.

The information collector 602 collects specific information at a current location. In the present disclosure, the information collector 602 may include the GPS module 605 and the communication module 606.

The GPS module 605 receives a radio wave transmitted from at least one GPS satellite to measure an arrival time from the GPS satellite to the portable terminal, and recognizes current location information of the portable terminal. The communication module 606 processes a signal transmitted and received through an antenna for voice and data communication. For example, device information is received from a neighboring device pre-set by the user.

The input unit 603 provides the controller 601 with input data generated according to a user's selection. For example, a command for starting automatic unlocking and at least one of any radius information and neighboring device information are received from the user.

The storage unit 604 may include a program storage unit for storing a program for controlling an operation of the portable terminal and a data storage unit for storing data generated while the program is executed. For example, if location information and neighboring device information are not pre-stored in the portable terminal, the information is stored.

In the aforementioned structure, the controller 601 can perform an overall function of the terminal. Although these elements are separately configured and illustrated in the present disclosure, this is for exemplary purposes only. Therefore, when a product is implemented in practice, all of the functions of the terminal may be processed by the controller 601, or only some of the functions may be processed by the controller 601.

The units described herein may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method to automatically unlock a portable device, the method comprising:
 receiving an information from a user;
 in response to determining that the information received from the user is not pre-stored, storing the information as pre-set information;
 displaying a lock screen in the portable device;
 receiving another information from an external device, wherein the another information includes location information of the portable device or device information of the external device;
 determining whether the another information corresponds with the pre-set information by the user in the portable device, and
 automatically unlocking the lock screen in response to the determining that the another information corresponds with the pre-set information.

2. The method of claim 1, wherein receiving the another information comprises receiving the another information when the portable device is within a predetermined distance from the external device.

3. The method of claim 2, further comprising before receiving the another information when the portable device is within the predetermined distance from the external device, receiving an indication that the portable device is within the predetermined distance from the external device.

4. The method of claim 1, wherein receiving the another information comprises receiving the another information when the portable device is within predetermined area shared by the external device.

5. The method of claim 4, further comprising before receiving the another information when the portable device is within the predetermined area shared by the external device, receiving an indication that the portable device is within the predetermined area shared by the external device.

6. A method to automatically unlock a portable device, the method comprising:
- displaying a lock screen in the portable device;
- receiving information from an external device through at least one of near field communication or receiving information from a base station if the external device and the portable device are located in a cell of a same base station, wherein the information includes location information of the portable device;
- determining whether the received information corresponds with pre-set information by a user in the portable device, and
- automatically unlocking the lock screen in response to the determining that the received information corresponds with the pre-set information.

7. The method of claim 6, wherein the near field communication comprises at least one of BLUETOOTH® communication or ZIGBEE® communication.

8. An apparatus configured to automatically unlock a portable device, the apparatus comprising:
- a communicator configured to communicate with an external device; and
- a processor configured to:
  - receive an information from a user,
  - in response to determining that the information received from the user is not pre-stored, store the information as pre-set information,
  - display a lock screen in the portable device,
  - receive, if the lock screen is displayed, another information from the external device, wherein the information includes location information of the portable device or device information of the external device,
  - determine whether the another information corresponds with pre-set information by the user in the portable device, and
  - automatically unlock the lock screen in response to determining that the another information corresponds with the pre-set information.

9. The apparatus of claim 8, wherein the processor is configured to receive the information when the portable device is within a predetermined distance from the external device.

10. The apparatus of claim 9, wherein when the portable device is within the predetermined distance from the external device, the processor is configured to receive an indication that the portable device is within the predetermined distance from the external device before receiving the device information.

11. The apparatus of claim 8, wherein the processor is configured to receive the information when the portable device is within predetermined area shared by the external device.

12. The apparatus of claim 11, wherein when the portable device is within the predetermined area shared by the external device, the communicator is configured to receive an indication that the portable device is within the predetermined area shared by the external device before receiving the device information.

13. An apparatus configured to automatically unlock a portable device, the apparatus comprising:
- a communicator configured to communicate with an external device; and
- a processor configured to:
- display a lock screen in the portable device,
- receive, if the lock screen is displayed, information from the external device through at least one of near field communication or receive information from a base station if the portable device and the external device are located in a cell of a same base station, wherein the information includes location information of the portable device,
- determine whether the received information corresponds with pre-set information by a user in the portable device, and
- automatically unlock the lock screen in response to determining that the received information corresponds with the pre-set information.

14. The apparatus of claim 13, wherein the near field communication comprises at least one of BLUETOOTH® communication or ZIGBEE® communication.

* * * * *

UNITED STATES PATENT AND TRADEMARK OFFICE
CERTIFICATE OF CORRECTION

PATENT NO. : 9,965,605 B2  
APPLICATION NO. : 13/651268  
DATED : May 8, 2018  
INVENTOR(S) : Jin-Won Seo et al.

Page 1 of 1

It is certified that error appears in the above-identified patent and that said Letters Patent is hereby corrected as shown below:

On the Title Page

Item (72) Inventors, "Sung-Wook Hyun" should be changed to --Sung-Wook Byun--.

Signed and Sealed this  
Nineteenth Day of June, 2018

Andrei Iancu  
*Director of the United States Patent and Trademark Office*